(12) United States Patent
Benitez Torres

(10) Patent No.: US 11,389,012 B2
(45) Date of Patent: Jul. 19, 2022

(54) AUTOMATED MULTI-DISPENSER AND MULTI-REPLENISHER OF PRODUCTS, AND METHOD FOR PRODUCT UNLOADING

(71) Applicant: Jorge Benitez Torres, Madrid (ES)

(72) Inventor: Jorge Benitez Torres, Madrid (ES)

( * ) Notice: Subject to any disclaimer, the term of this patent is extended or adjusted under 35 U.S.C. 154(b) by 45 days.

(21) Appl. No.: 15/648,474

(22) Filed: Jul. 13, 2017

(65) Prior Publication Data

US 2019/0014922 A1 Jan. 17, 2019

(51) Int. Cl.
| | | |
|---|---|---|
| *A47F 1/08* | (2006.01) | |
| *B65G 1/06* | (2006.01) | |
| *G07F 11/00* | (2006.01) | |
| *B65G 47/88* | (2006.01) | |
| *B65G 1/08* | (2006.01) | |

(52) U.S. Cl.
CPC ............... *A47F 1/08* (2013.01); *B65G 1/065* (2013.01); *B65G 1/08* (2013.01); *B65G 47/8861* (2013.01); *G07F 11/005* (2013.01)

(58) Field of Classification Search
CPC .. A47F 1/08; B65G 1/065; B65G 1/08; B65G 47/8861; G07F 11/005
USPC .................................................. 700/231–244
See application file for complete search history.

(56) References Cited

U.S. PATENT DOCUMENTS

| | | | | |
|---|---|---|---|---|
| 3,750,804 A | * | 8/1973 | Lemelson ........... | G07F 11/1657 414/276 |
| 4,239,436 A | * | 12/1980 | Wildenaur ............... | B65G 1/06 198/766 |
| 4,752,175 A | * | 6/1988 | Lichti .................... | B65G 1/127 198/368 |
| 5,222,855 A | * | 6/1993 | Bernard, II .......... | B65G 1/0485 198/340 |
| 5,388,955 A | * | 2/1995 | Schroder .................. | B65G 1/02 414/279 |
| 6,631,606 B2 | * | 10/2003 | Lawton .................. | G05B 19/00 53/473 |
| 7,695,235 B1 | * | 4/2010 | Rallis ..................... | B65G 47/54 414/400 |
| 8,972,042 B2 | * | 3/2015 | Uribe .................... | B65G 1/1373 700/216 |
| 2005/0002772 A1 | * | 1/2005 | Stone .................... | B65G 63/002 414/788 |
| 2011/0106295 A1 | * | 5/2011 | Miranda .............. | B65G 1/1378 700/216 |
| 2014/0103062 A1 | * | 4/2014 | Rose, Jr. ................. | G07F 11/34 221/124 |

* cited by examiner

*Primary Examiner* — Michael Collins

(57) ABSTRACT

An automated multi-dispenser and multi-replenisher of products for concurrent loading and unloading of products that simplifies existing systems, consisting of an elongated structure (1) which supports several central shelving units (2) with a set of inclined shelves (3) arranged at different heights one below the other and one next to the other, comprising a plurality of horizontal shelves (5) at each longitudinal side of the elongated structure (1); at least one rear loading subsystem in the form of a cart (6), which travels over these lateral shelving units (4) in order to leave the products on the highest section of the inclined shelves (3); at least one front unloading subsystem in the form of a cart (7), which collects the products from the lowest section of the inclined shelves (3), where the carts (6) and (7) also cover a plurality of inclined channels (8) including a support (9).

4 Claims, 12 Drawing Sheets

AUTOMATED MULTI-DISPENSER AND MULTI-REPLENISHER OF PRODUCTS, AND METHOD FOR PRODUCT UNLOADING

FIELD OF THE INVENTION

The present invention relates to a multi-dispenser and multi-replenisher for concurrent loading and unloading of products, which makes it possible to simultaneously load and unload as many products as there are inclined shelves in the structure, simplifying existing unloading systems and reducing dispensing and replenishment times.

BACKGROUND OF THE INVENTION

The present invention, as stated in the title of this specification, relates to an automated multi-dispenser and multi-replenisher of products whose major field of application is the pharmaceutical industry, although it may also be used in any other sector where small goods are stored and dispensed.

Products are stored on modular inclined shelves that form part of characteristic modular shelving units, configuring an elongated shelving structure in the longitudinal direction.

Automated storage systems for pharmaceutical products located in the pharmacy itself are based on a technology used with other systems and adapted to the issues related to pharmacies.

This type of solutions bring the advantages of warehouse automation to the pharmaceutical industry, namely:
  Product damage reduction.
  Increased storage density.
  Storage flexibility.
  Reduced order picking time.
  Improved pharmaceutical care, since the customer-facing staff does not have to go to the warehouse in order to pick products, allowing them to spend more time with clients.

According to the state of the art, there are methods applied to storage and automated distribution facilities, such as the one revealed by the American U.S. Pat. No. 5,386,462, with filing date on May 10, 1994, related to a vending system in which a compartment unit (1) with a given number of compartments (2) each of which is provided with a door (4) that can be locked by a locking device is assembled in a room (6) together with a computing unit (3). A presentation device (40) is assigned to the computing unit (3), whereby the presentation unit comprises at least one memory device (42, 49) in which text and/or visual information about the goods offered in designated compartments (2) are stored. The compartment number of the compartment (2) containing the corresponding goods as well as the price of these goods can be assigned to the text and/or visual information. The presentation device (40) can receive information to reserve a compartment (2), the offer number assigned to certain text and/or visual information and information pertaining to the identification of the customer by an input device (43, 47).

The document WO 03/010074 pertains to a method for operating an elevated region of the rack, which consists of several rack planes arranged one above the other by means of a dedicated and independent, mechanically coupled, height- and length-adjustable rack serving device. In this case, in each elevated rack region embodied as an independent, closed rack unit, containers, trays or the like undergo interim storage in a zone located on the same level as an interface to the outside, are transferred by the rack serving device for storage or unloading in order to empty the storage site, and transported by means of at least one elevator and/or a transport connection from or to a transport system or workplace outside the rack system. The buffer zone stores the products until they can be taken over by the elevator system. As a result, a highly flexible interface can be created with the transport technology located outside the rack system and, in particular, a high dispatch capacity can be set up.

The main disadvantage of automated storage with the abovementioned systems is its high cost in terms of both acquisition and maintenance; furthermore, they are very rigid systems and do not offer versatility to the end user.

The technology used is based on both horizontal and vertical transmission of movement by means of toothed or flat belts, worm drives or permanent-magnet linear motors (horizontal motion only). This kind of drive systems entails high costs associated with maintenance and worn-out parts, together with difficult replacement.

With the purpose of reaching the goals while avoiding the abovementioned issues, the invention provides an automated multi-dispenser and multi-replenisher of products, which is fully modular and enables cost reductions when manufacturing, assembling and commissioning the plant.

Products are stored on the inclined shelves of the characteristic modular shelving units, which form an elongated shelving structure in the longitudinal direction.

The essential character of the invention is focused on the characteristic lateral shelving units, which comprise horizontally arranged shelves and are placed on each side of the main central shelving units, so that an independent "cart" subsystem travels over each horizontal shelf, for product loading and unloading, with respect to the inclined shelves of the main central shelving units. The modular, horizontal shelving units may be easily adapted to the required length of the elongated structure of the main shelving units, so that both loading and unloading subsystems have a horizontal translational motion parallel to the central elongated structure of shelving units.

Vertical motion is not required for the loading and unloading subsystems, as there is a subsystem for each horizontal shelf of products. This is aimed to achieve simultaneous loading and unloading of products (which explains the use of the prefix "multi-"), enabling the system to load and unload at the same time as many products as there are inclined shelves in the structure.

This system is designed to improve modularity, reduce manufacturing and installation costs, simplify existing systems and save time on dispensing and replenishment operations.

DESCRIPTION OF THE INVENTION

The present invention relates to an automated multi-dispenser and multi-replenisher of products comprising an elongated, central shelving structure with a set of inclined shelves arranged at different heights, equipped with other characteristic shelving units with horizontal shelves at each longitudinal side of the elongated shelving structure, so that two subsystems travel over each horizontal shelf, a rear loading "cart" subsystem, which places the packaged products on the highest portion of the shelves from one side of the elongated structure, and a front unloading "cart" subsystem, which collects the packaged products from the lowest portion of the shelves, providing a fully automated system.

The loading and unloading subsystems travel horizontally over each of the horizontal shelves of the characteristic modular shelving units, which are adapted to the required length for the elongated structure of the main central shelving.

The loading and unloading subsystems have a horizontal translational motion parallel to the elongated structure of the central shelving.

Vertical motion is not required for such loading and unloading "cart" subsystems, as there is a subsystem for each shelf of products. Thus product loading and unloading are executed concurrently, allowing the system to simultaneously load and unload a number of products equal to the number of inclined shelves of the structure.

The carts are characterized by their stand-alone operation; they are automated guided vehicles with wireless control that locate products in the inclined channels using an optical linear encoder. At the top of the carts there is also a container-shaped platform used for product transfer. This platform turns perpendicularly to the horizontal shelf and rises, thus pushing the support of the inclined product channel in order to collect the product, or goes down in order to place a product in the inclined channel.

The inclined channels of products are specifically designed to facilitate the collection of a single product, allowing the rest to remain on the channel. This design is achieved by means of a part located in the intermediate region between every pair of adjacent channels. This part consists of two portions: one holding all the products of the channel and the other holding all the products of the channel except for the first one, which is dropped and slides down by gravity. For this purpose, the part rotates about an axis, holding the entire column on one side of the rotation, or all the products except for the first one at the other side of the rotation. This will be discussed in further detail below.

With the described arrangement, the plant operation is basically performed as follows.

First, when a new (duly packaged) product is received or a client does not purchase a product that had been taken out of the warehouse, it is introduced again in the warehouse in a semi-automated manner. There will be a dedicated area for the received products that need to be incorporated into the warehouse.

The dimensions of all the products stored in the system are recorded in order to check for any changes in dimensions, which will require relocating the particular product to the appropriate size place.

A mobile terminal (MT, i.e. smartphones or similar devices) is used for receiving the products to be introduced in the warehouse. Each product is selected and its barcode is read by the MT.

The product is placed on a measuring subsystem. As for new products or changes in sizes, the corresponding dimensions are recorded and a new position is assigned to them in the system.

The system indicates the cart in which the product should be placed. Once the product is in the cart, the MT is used for instructing the system to carry the product to its location in the warehouse.

The corresponding cart carries the product to its channel and takes down the upper platform, where the product is transferred, until the product slides by gravity in the channel reaching the dead stop of the channel or the previously loaded package.

The dispensing process of a stored product is initiated by the pharmacist, which submits the pertinent command without leaving the customer area. The system instructs the corresponding cart to pick the specific product. The cart advances with the upper platform in a horizontal position until it is placed in front of the channel that contains the product. Without stopping, it raises the upper platform until it pushes the product channel support using the protrusion of one of its ends. The cart momentarily stops and waits for the product to slide down by gravity into the cart's upper platform, while holding the other products of the channel. The cart moves backwards while placing the upper platform in a horizontal position; thus the support of the product channel is released and recovers its rest position, enabling the remaining products in the channel to fall down on the dead stop of the channel, where they are ready for future unloading operations.

The cart carries the product to the exit point and takes down the upper platform allowing the product to slide down by gravity. As a result, the product slides into the receipt station of the pharmacist or is dropped on a conveyor belt that carries it to said station.

Therefor a new system for product loading and unloading has been developed, which provides faster rates of reception and dispensing of products, as well as a high level of modularity and an extremely reduced price.

Easy maintenance is guaranteed, since the clients may have a number of additional carts according to their needs, enabling them to personally replace damaged carts.

Shelving modules are manufactured in a standard length; as a result, all plants will consist of a certain number of standard modules together with a tailored section. In the case of length variation of the plant, only the final section needs to be replaced.

The surface finish of the inclined shelves will assure the appropriate transfer of packaged products by gravity. The shelves will be inclined enough to allow products to slide down by gravity while avoiding an excessive inclination, as this would exert too much pressure on the second product of the channel as long as it holds the remaining products until the first product slides down into the platform of the unloading cart.

The shelves will be fastened to the shelving units by means of fast anchors without any tools, assuring a quick and easy method to modify shelf arrangements.

Furthermore profiles delimiting each product channel will be made of a motion enabling material and can be quickly disassembled for easy and quick changes to the channel configuration. They will be composed of a hard yet slightly flexible material that may be slightly bent and naturally tends to recover its straight position for proper operation of the holding system of channel products.

As for the software, the project will include the development of an application for system governance comprising three blocks: management, maintenance and control.

The management block will control product addition and retrieval, as well as the removal of expired goods. It will also provide information, statistical and commercially valuable data to inform the decision-making process.

The maintenance block will optimize the warehouse and manage the available space and physical definition of the shelves.

Finally the control block will address the physical motion of the system through the communication established with the carts, with the control systems of the shelving units and with the mobile terminals used for system replenishment and control purposes.

With the aim of contributing to a better understanding of this specification, a set of drawings is attached below to this document as an integral part of it, representing the field of the invention by way of illustration and not limitation.

PREFERRED EMBODIMENT OF THE INVENTION

Figure 1:
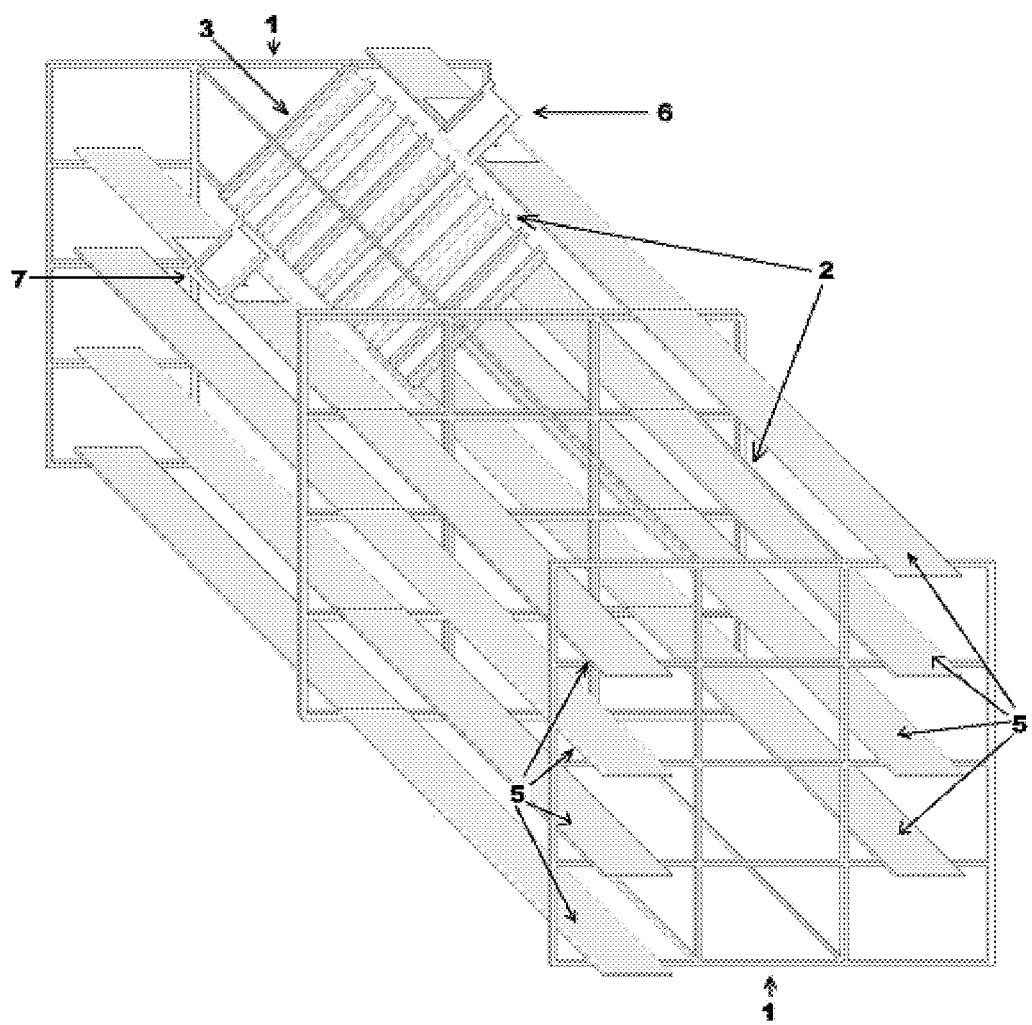
FIG. 1 is a perspective view of the automated multi-dispenser and multi-replenisher of products, which represents the field of the invention. It includes an elongated structure of modular shelving units supporting a set of inclined shelves where products are stored. Each side of this structure comprises additional shelving units with specific characteristics, horizontal shelves, and rear loading subsystems and front unloading subsystems travelling over every shelf.
Figure 2:
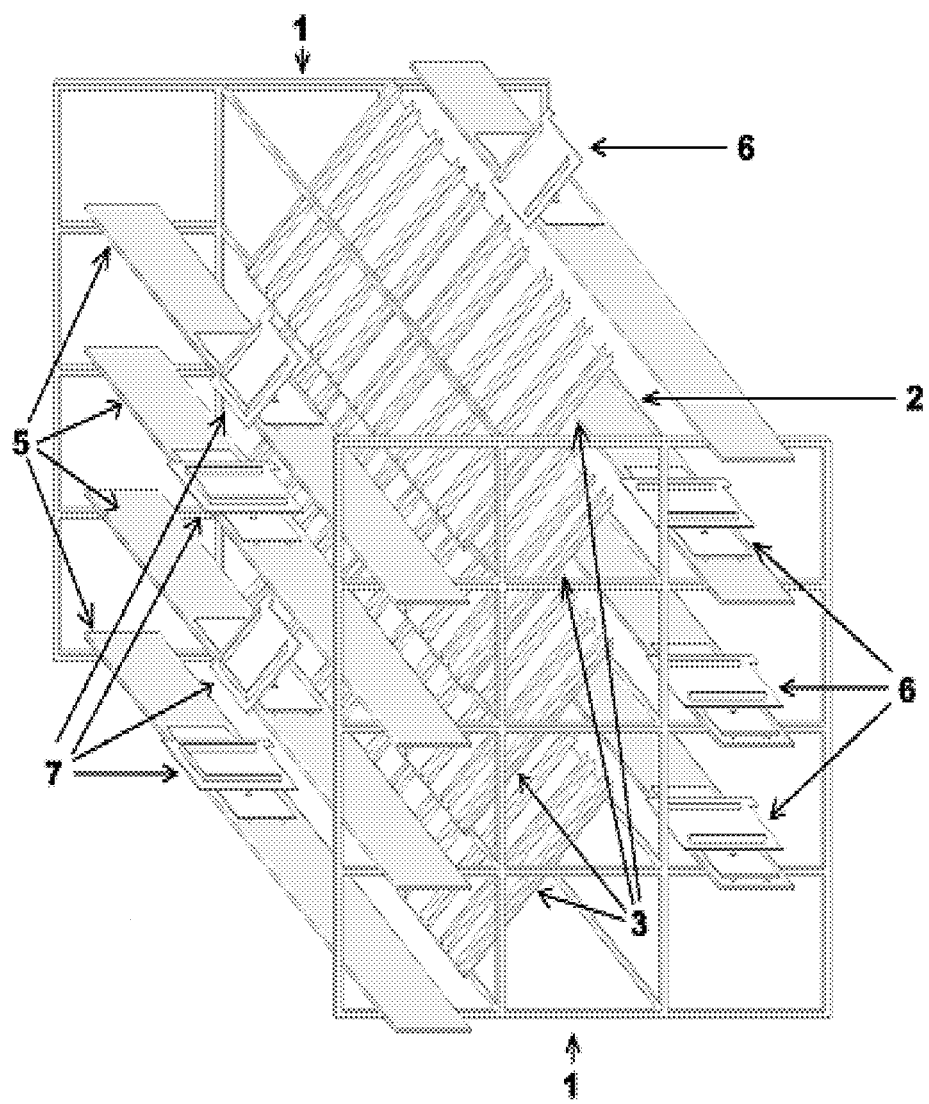
FIG. 2 is a view similar to FIG. 1, but showing greater detail and a single shelving module.
Figure 3:
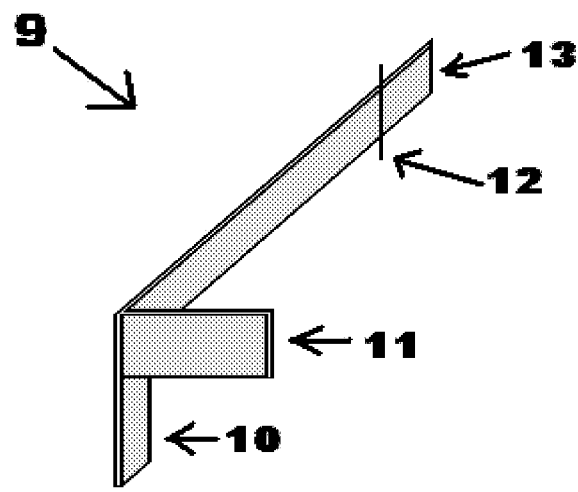
FIGS. 3 and 4 are two different views of the product holding part of an inclined channel, which is placed between every pair of adjacent channels.
Figure 4:
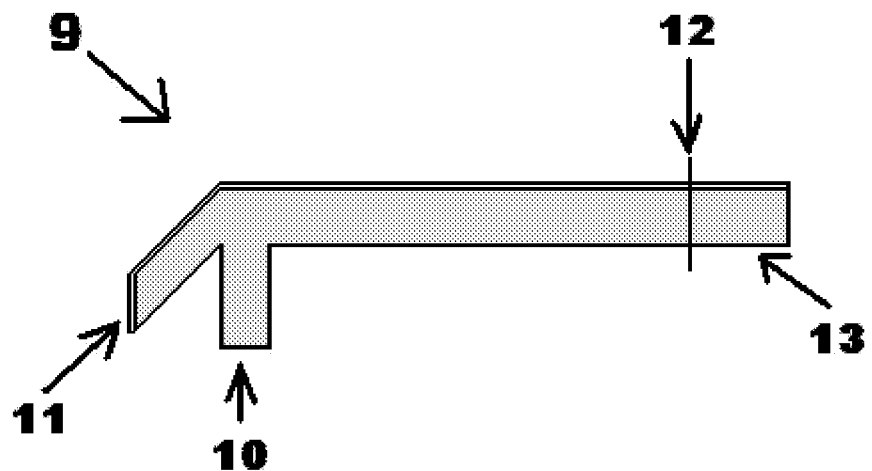
Figure 5:
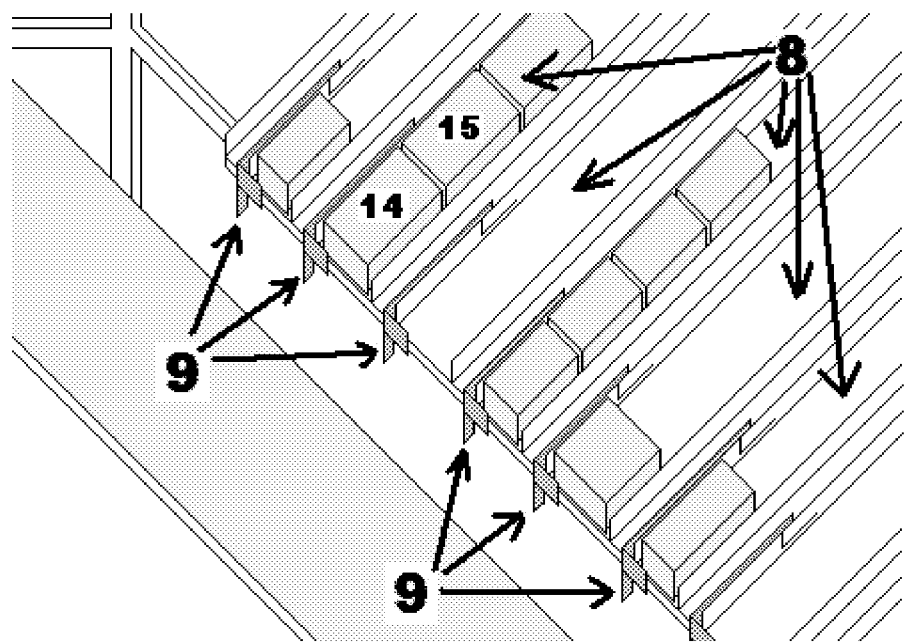
FIGS. 5 to 15 are perspective views showing the possible states of one of the unloading (cart) subsystems during the unloading process of a particular product, together with the process sequence.
Figure 6:
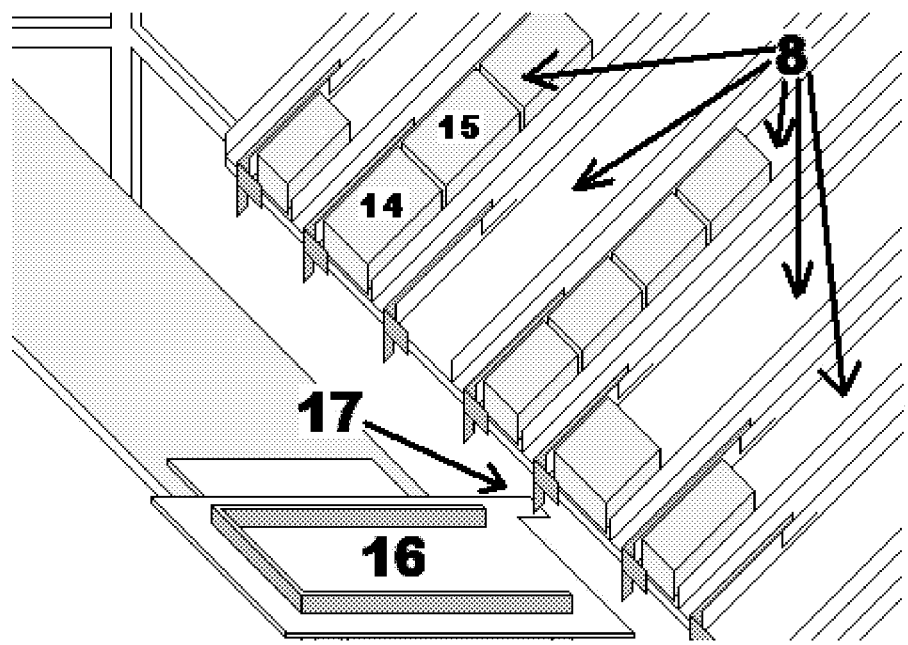
Figure 7:
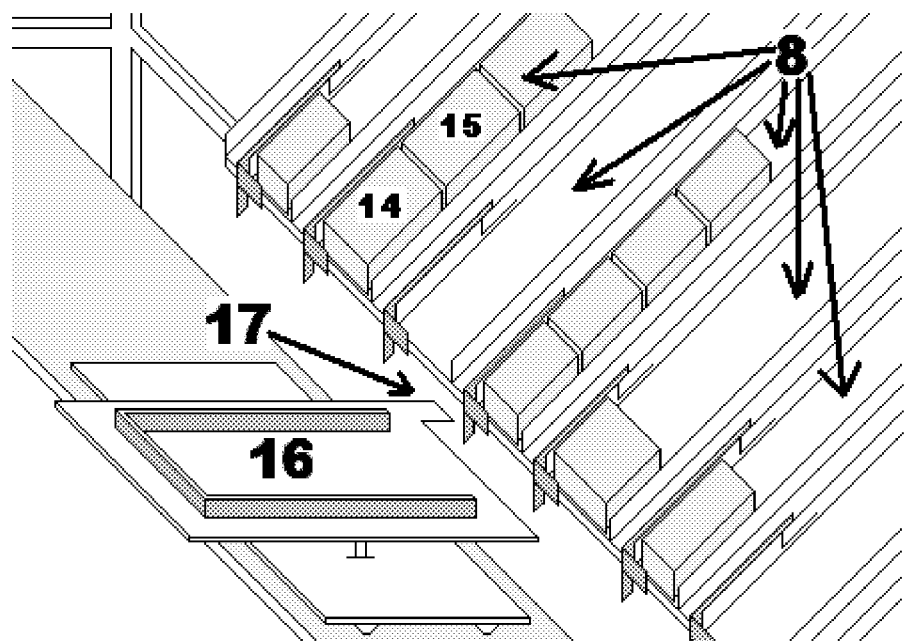
Figure 8:
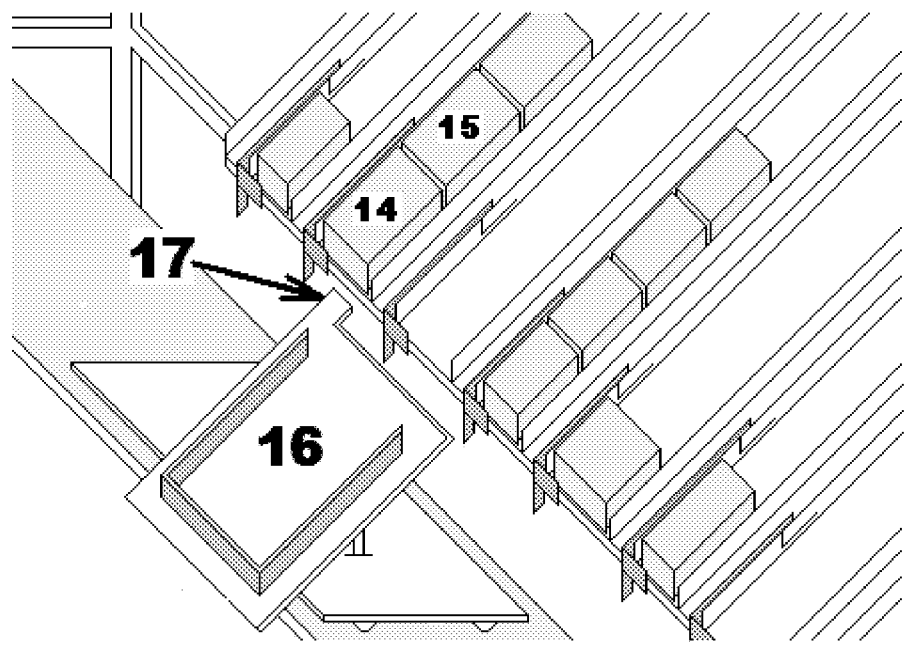
Figure 9:
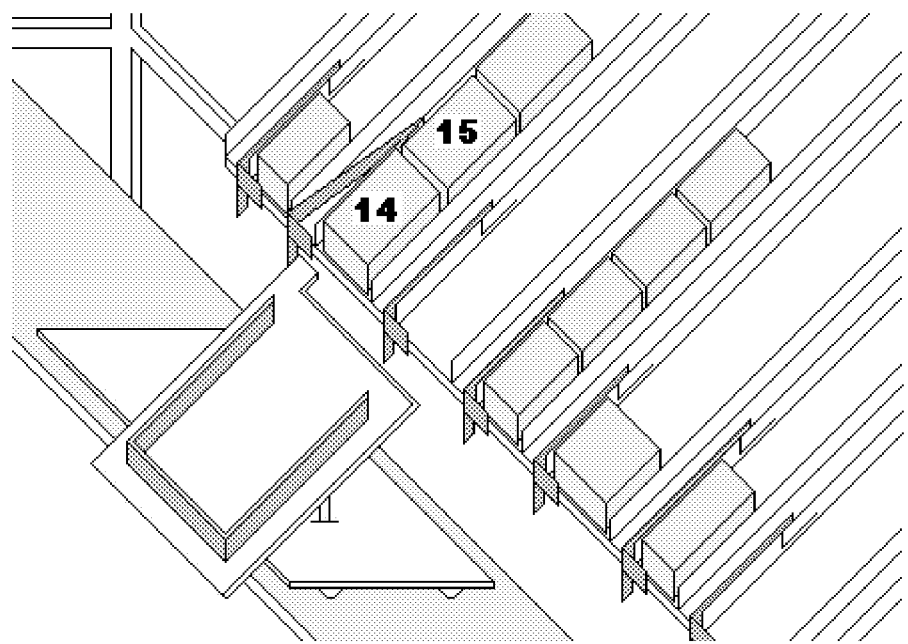
Figure 10:
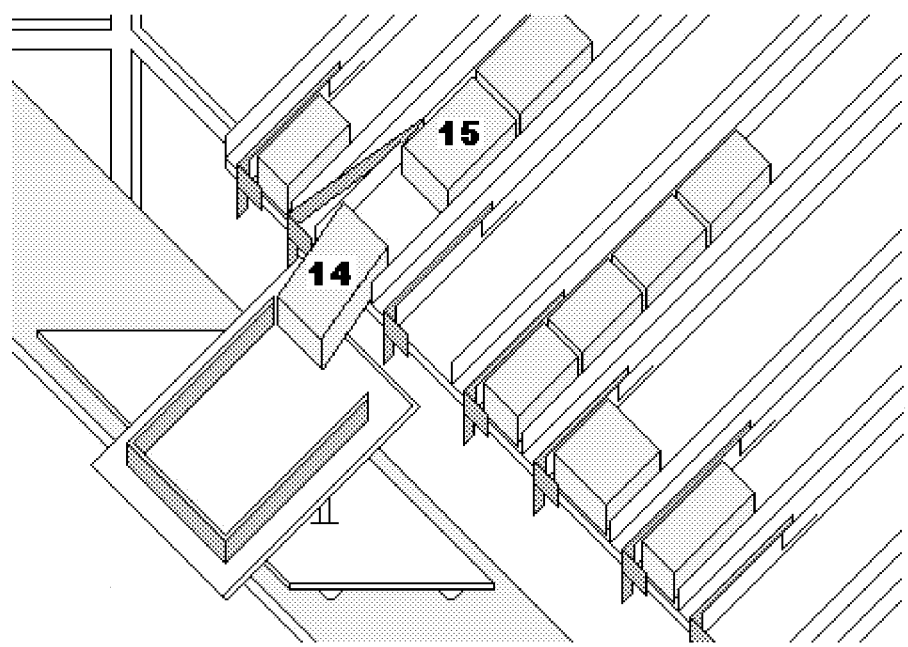
Figure 11:
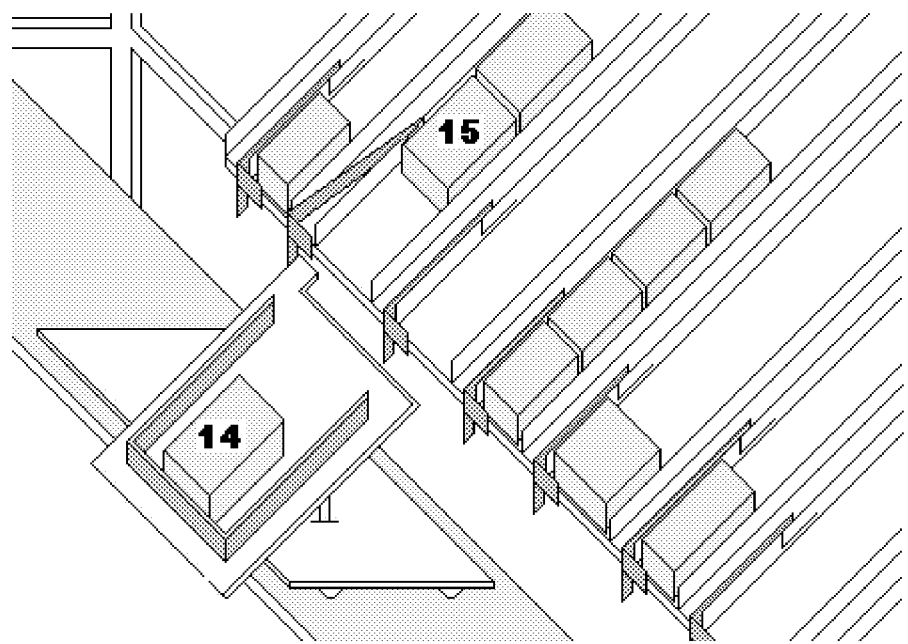
Figure 12:
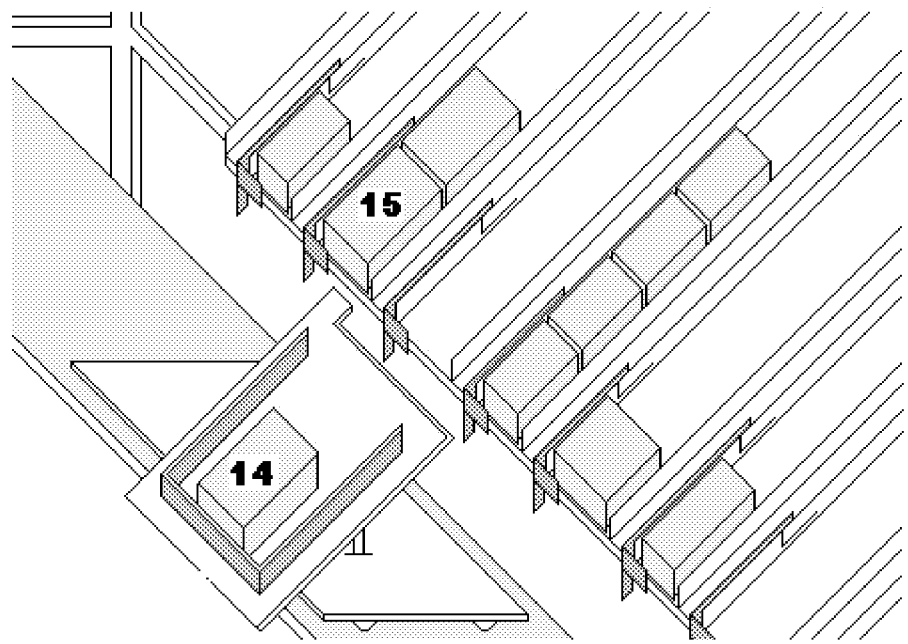
Figure 13:
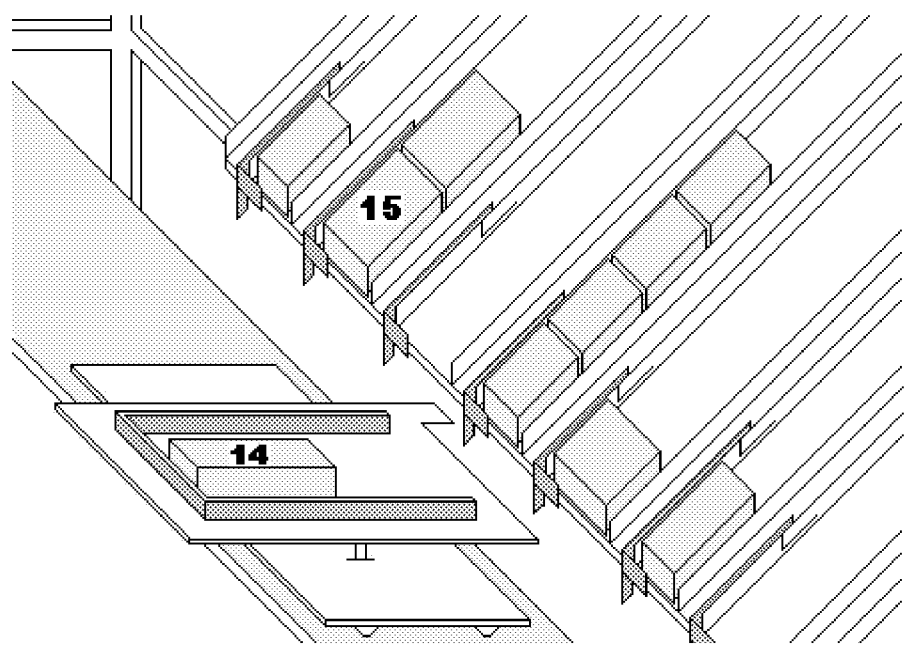
Figure 14:
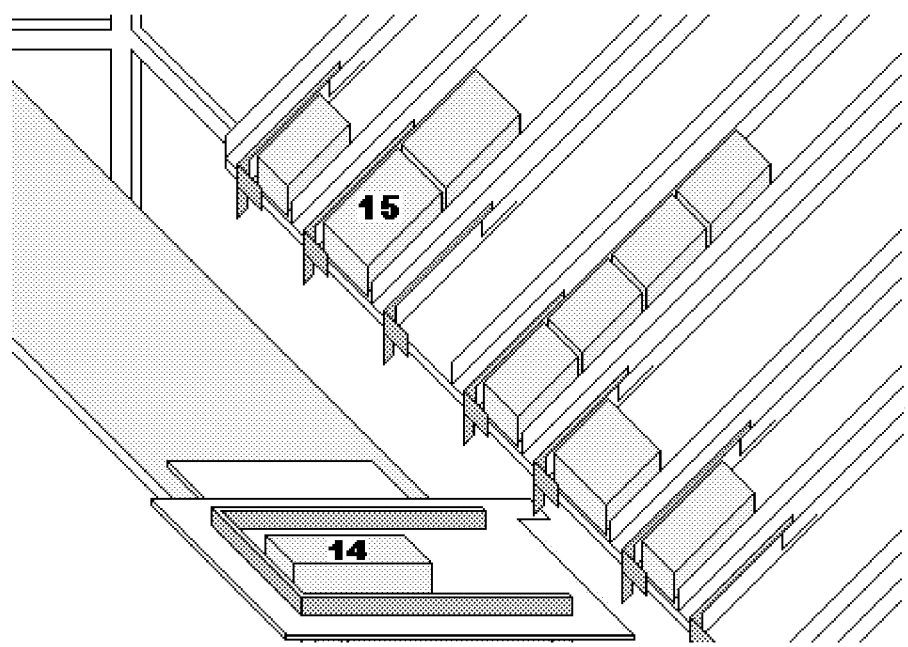
Figure 15:
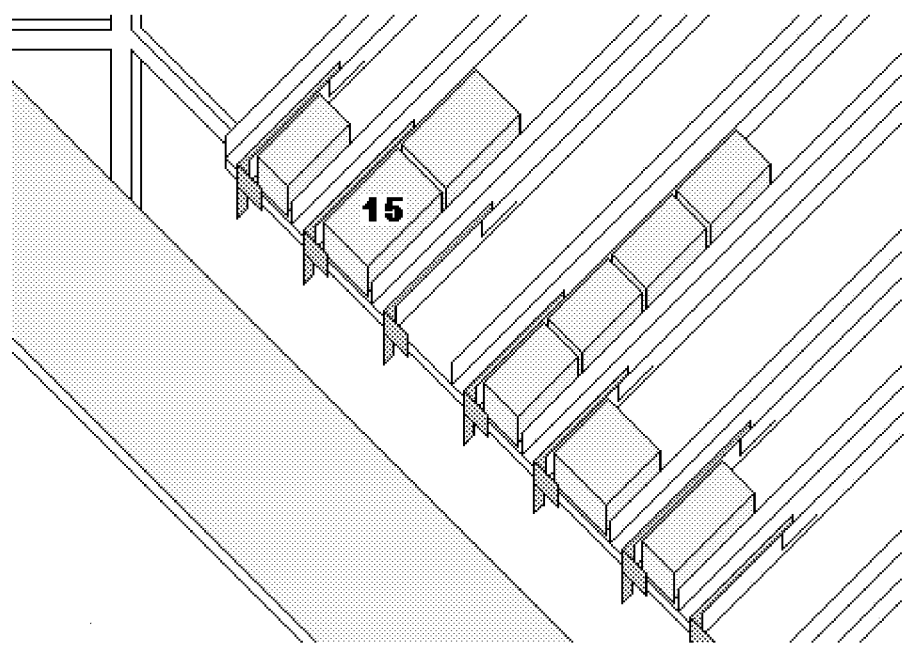
Figure 16:
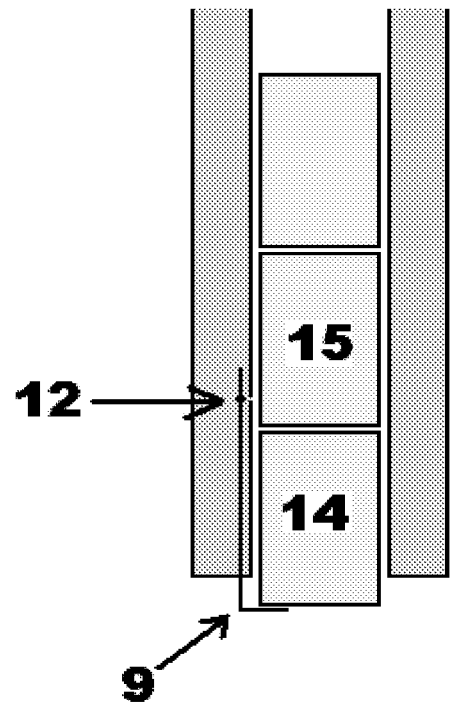
FIGS. 16 to 20 are plan views showing the possible states of one of the unloading (cart) subsystems during the unloading process of a particular product, together with the sequence of this process.
Figure 17:
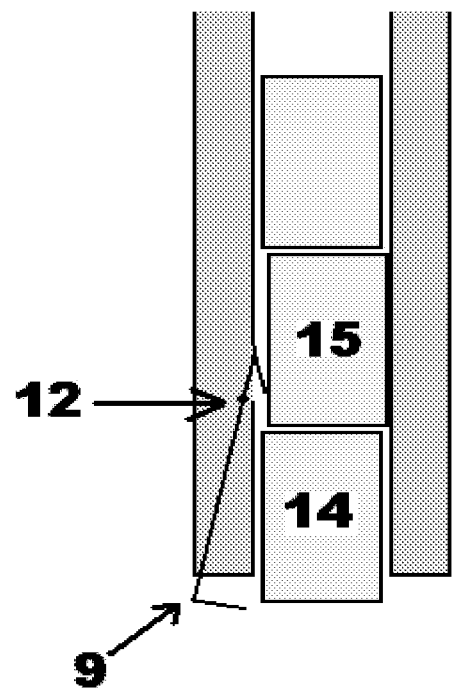
Figure 18:
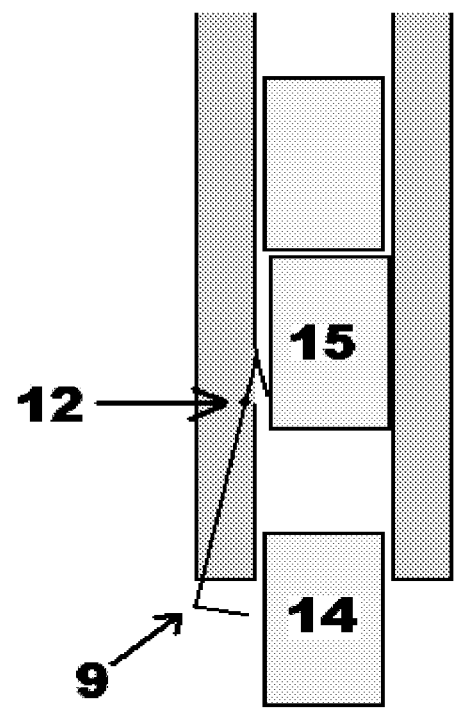
Figure 19:
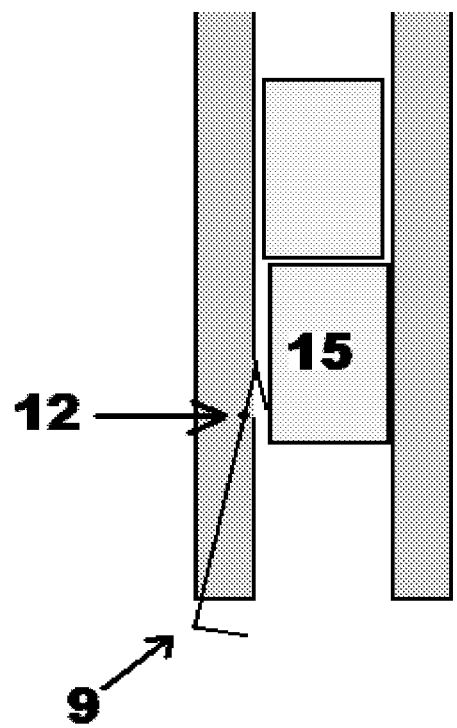
Figure 20:
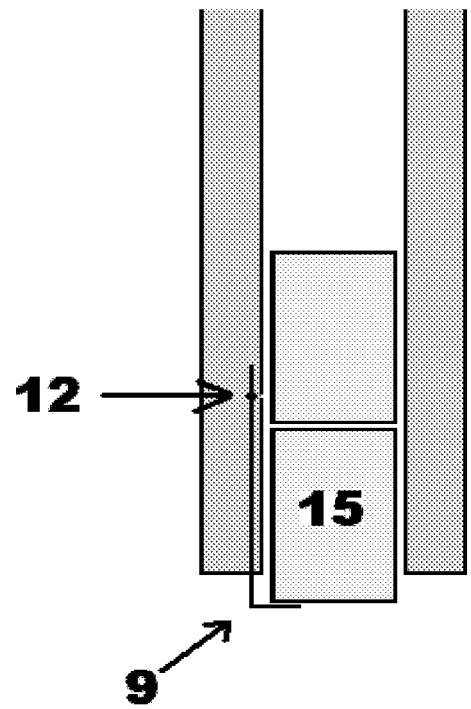
Figure 21:
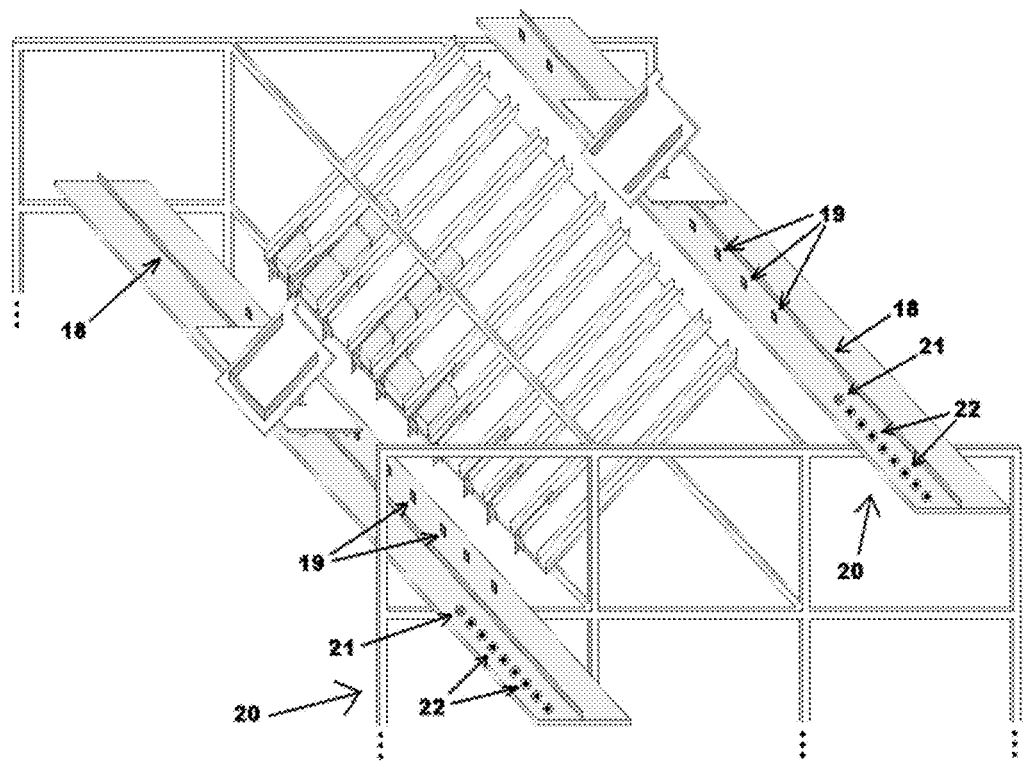
FIG. 21 is a perspective view of an individual inclined shelf with its corresponding horizontal shelves, showing the guiding profiles for carts, the marks used to locate products and the communication system between each shelf and its cart.
Figure 22:
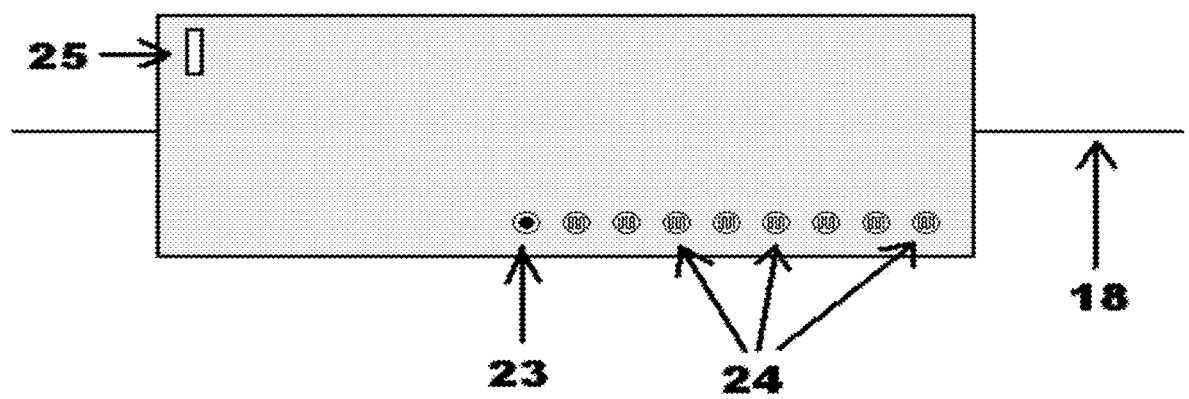
FIG. 22 is a plan view of a cart base, showing the guiding profile of the cart, the mark detecting photoswitch and the communication system between the cart and its shelf.

The automated multi-dispenser and multi-replenisher of products of the present embodiment essentially consists of an elongated structure (1) which supports several central shelving units (2) with a set of inclined shelves (3) arranged at different heights one below the other and one next to the other, this automated multi-dispenser and multi-replenisher of products comprising a plurality of horizontal shelves (5) at each longitudinal side of the elongated structure (1); at least one rear loading subsystem in the form of a cart (6), which travels over these lateral shelving units (4) in order to leave the products on the highest section of the inclined shelves (3); at least one front unloading subsystem in the form of a cart (7), which collects the products from the lowest section of the inclined shelves (3), where the carts (6) and (7) also cover a plurality of inclined channels (8) including a support (9).

The carts (6) and (7) feature a horizontal translational motion parallel to the elongated, central shelving structure (1), and they are not required to move vertically since there is a cart for each vertical level of inclined shelves (3) where products are stored.

The carts (6) and (7) are automated guided vehicles with wireless control that locate products in the inclined channels (8) using an optical linear encoder and include a container-shaped platform (16) used for product transfer at the top of the cart.

This platform (16) turns perpendicularly to each horizontal shelf (5) and rises, thus pushing by means of its protrusion (17) the support (9) of the inclined product channel (8) in order to pick the product, or goes down in order to place a product in the inclined channel (8).

The support (9) of the inclined channel (8) is characterized by a specific method for collecting an individual product while the others remain in the channel; for this purpose, the support (9) is located in the intermediate region between every pair of adjacent inclined channels (8) and each cart pushes the bottom part (10) of the support (9), which rotates about the axis (12) and pushes the second product (15) against the opposite wall of the inclined channel (8) using its terminal section (13), holding all the products in the channel except for the first one (14), which is dropped and slides down by gravity. When the cart goes backward, it releases the bottom part (10) and the support (9) recovers its rest position, where it holds all the products of the channel by means of a perpendicular end (11).

As explained above, the carts (6) and (7) are automated guided vehicles, i.e., they may be any vehicle that is able to travel over horizontal shelves: wheeled vehicles, single rail or double rail vehicles, trolleys, single rails with permanent magnets, Scalextric type, etc. According to the preferred embodiment, carts are wheeled, battery-powered vehicles with optional opportunity charging, driven by electric motors, that travel with guided bearings along a profile (18) in a direction perpendicular to the horizontal shelves (5) over which they travel, locating products in the inclined channels (8) through an optical linear encoder (photoswitch) (25) with opaque marks (19) in front of each inclined channel (8) under simple PLC technology control, and communicating with the system via LED lighting.

The benefit of LED lighting communication is that its manufacturing and maintenance costs are very low (each LED costs just a few cents) and it only requires light sensors, which are very cheap too, for managing communications without using controllers. Furthermore it eliminates the potential wave interferences associated with wireless wave systems, and its programming is simple and reliable.

Every horizontal shelf (5) has at least one communication area (20) with the pertinent cart. This communication area (20) includes a light sensor (21) (LDR photoresistor) for identifying when the cart is ready in terms of communication, and N LEDs (22) to communicate (send) using light $2^N$ different statuses (number of product/inclined product channel).

Each cart features a LED (23), used to signal when it is ready for communication purposes, and N light sensors (24) (LDR photoresistor), used to communicate (receive) using light $2^N$ different statuses (number of product/inclined product channel).

The system structure is very simple. The POS (point-of-sale) terminals, the central computer (which may be one of the POS terminals), the MTs (mobile terminals) and the CCSI (communication and control system for the invention) are connected to a local network (LAN) through which the POS terminals and MTs instruct the CCSI which product is to be managed; therefore the CCSI only needs to turn the appropriate LEDs on in the specific shelf, while controlling cart availability through the status LED of the carts.

The procedure used for product collection enables the development of a product unloading method by means of the automated multi-dispenser and multi-replenisher of products, comprising the following operational stages:

The system instructs the corresponding cart to pick a product (14).

The cart advances with the upper platform (16) in a horizontal position until it is placed in front of the inclined channel (8) that contains the product (14).

Without stopping, the cart raises the upper platform (16) until it pushes the product channel support (9) using the protrusion (17) of one of its ends.

The cart momentarily stops and waits for the product to slide down by gravity into the cart's upper platform, while holding the other products of the channel.

The cart moves backwards while placing the upper platform (16) in a horizontal position; thus the support (9) of the product channel is released and recovers its rest position, leaving the remaining products in the channel (8) o the dead stop (11) of the channel (8).

The invention claimed is:

1. An automated multi-dispenser and multi-replenisher of products consisting of an elongated structure (1), which supports several central shelving units (2) with a set of inclined shelves (3) arranged at different heights one below the other and one next to the other, comprising a plurality of horizontal shelves (5) at each longitudinal side of the elongated structure (1), several shelving units (4), at least one rear loading subsystem in the form of a cart (6), which travels over these lateral shelving units (4) in order to leave the products on the highest section of the inclined shelves (3); at least one front unloading subsystem in the form of a cart (7), which collects the products from the lowest section of the inclined shelves (3); where the cart-type rear loading subsystem (6) and the cart-type front unloading subsystem (7) are automated guided vehicles with wireless control that locate products in the inclined channels (8) using an optical linear encoder and also cover a plurality of inclined channels (8) including a support (9) that is able to rotate about an axis (12), comprising a lower section (10), which is placed in a plane perpendicular to the dead stop (11), and a terminal section (13), which is placed in the plane containing the axis (12)

wherein a container-shaped platform (16) turns perpendicularly to each horizontal shelf (5) and rises, thus pushing by means of its protrusion (17) the support (9) of the inclined channel (8) in order to pick the product.

2. The automated multi-dispenser and multi-replenisher of products according to claim 1, wherein an optical linear encoder includes a photoswitch (25) with opaque marks (19) in front of each inclined channel (8) under simple PLC technology control, communicating with the system via LED lighting.

3. A method to pick a product (14) while another product (15) is kept in an inclined channel (8) using the automated multi-dispenser and multi-replenisher of products according to claim 1, wherein there is a support (9) situated in the intermediate region between each pair of adjacent inclined channels (8), and each cart (6) pushes a bottom part (10) of the support (9), which rotates about an axis (12) and pushes a second product (15) against a wall opposite of the inclined channel (8) using its terminal section (13), holding all the products in the channel (8) except for the first one (14), which slides down by gravity.

4. The method according to claim 3, comprising the following operating stages:

the system instructs the corresponding cart to pick a product (14)

the cart advances with the an upper platform (16) in a horizontal position until it is placed in front of the inclined channel (8) that contains the product (14) without stopping, the cart raises the upper platform (16) until it pushes the product channel support (9) using the a protrusion (17) of one of its ends, then the cart momentarily stops and waits for the product to slide down by gravity into the cart's upper platform, while holding the other products of the channel then the cart moves backwards while placing the upper platform (16) in a horizontal 5 position;

thus the support (9) of the product channel is released and recovers its rest position, leaving the remaining products in the channel (8) on the dead stop (11) of the channel (8).

* * * * *